(No Model.)

W. J. KEEP.
NUT FOR MICA FRAME BOLTS.

No. 421,723. Patented Feb. 18, 1890.

Witnesses.
John Edwards Jr.
W. H. Pierce

Inventor.
William J. Keep.
By James Shepard.
Atty.

UNITED STATES PATENT OFFICE.

WILLIAM J. KEEP, OF DETROIT, MICHIGAN, ASSIGNOR TO THE LAMSON & SESSIONS COMPANY, OF CLEVELAND, OHIO.

NUT FOR MICA-FRAME BOLTS.

SPECIFICATION forming part of Letters Patent No. 421,723, dated February 18, 1890.

Application filed December 9, 1889. Serial No. 333,073. (No model.)

*To all whom it may concern:*

Be it known that I, WILLIAM J. KEEP, a citizen of the United States, residing at Detroit, in the county of Wayne and State of Michigan, have invented certain new and useful Improvements in Ornamental Nuts for Mica-Frame Bolts, of which the following is a specification.

My invention relates to improvements in ornamental nuts for mica-frame bolts; and the object of my improvement is to produce a nut of a suitable ornamental appearance to be used upon the outside of mica-frames on stoves, and at the same time to produce a form of nut that is adapted to be turned with a wrench.

Figure 1:
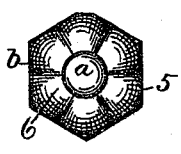
Figure 2:
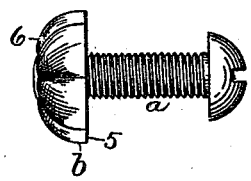
Figure 3:
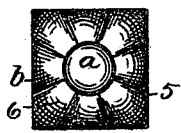
Figure 4:
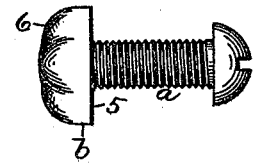

In the accompanying drawings, Figure 1 is a face view of said nut and end of the bolt. Fig. 2 is a side elevation of said nut and bolt, and Figs. 3 and 4 are corresponding views of the same, the base of the nut being square instead of hexagonal.

The bolt $a$ is of ordinary construction, and the nut $b$ is drilled and tapped to fit said bolt in the ordinary manner. I form the base 5 of the nut substantially flat upon its side face and at its edges of an angular form—as, for instance, hexagonal—as shown in Figs. 1 and 2, or square, as shown in Figs. 3 and 4. The front face 6 of the nut is rounded gradually from the base to its central hole, so as to give said face, when viewed in edge view, the form of a flatted semicircle. I prefer, also, to ornament this front face—as, for instance, by a series of radial beads. By this construction I am enabled to place a nut of simple and inexpensive construction upon the outside of the stove, where it will not so quickly become rusty, and is therefore readily removable for replacing the mica. Although it is adapted to receive a wrench, its rounded front face, especially when ornamented, relieves it of the plainness of an ordinary nut and permits it to be used where the ordinary nut would not be.

I am aware that bolts have been placed in mica-frames with plain nuts upon the outside of the frame, which nuts were covered by an expensive ornamental cap, and I hereby disclaim the same.

I claim as my invention—

The herein-described nut for mica-frame bolts, the same consisting of a base with angular edges and an ornamental and rounded front face, substantially as described, and for the purpose specified.

WILLIAM J. KEEP.

Witnesses:
   FRANK L. BROMLEY,
   ISAAC S. FILER.